Aug. 20, 1957 H. B. SORENSEN 2,803,228
ECCENTRICALLY MOUNTED SPARK PLUG

Filed May 10, 1954 3 Sheets-Sheet 1

INVENTOR.
HELGE B. SORENSEN
BY
Wilson, Redrow, and Gaines
ATTORNEYS

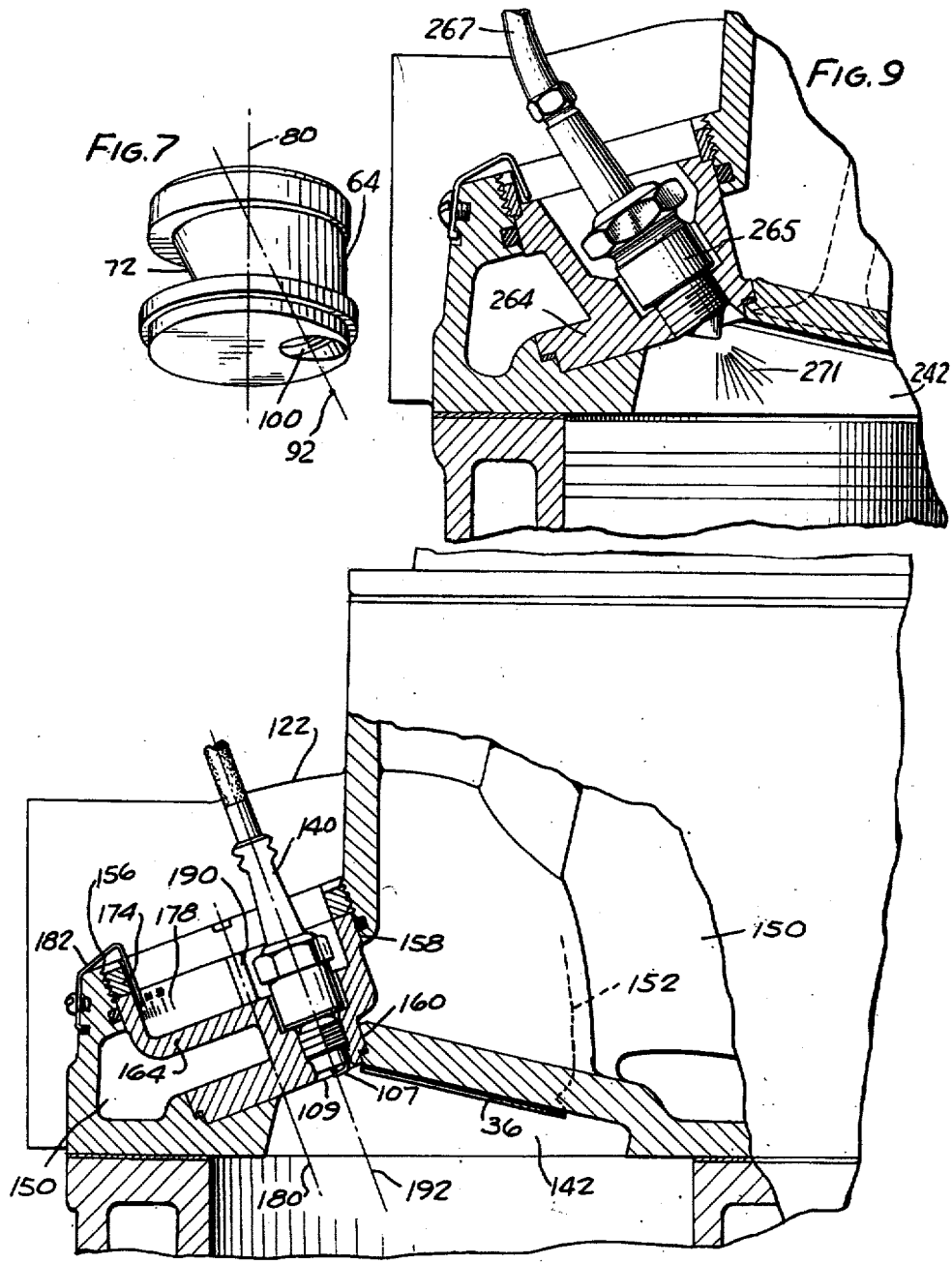

U nited States Patent Office 2,803,228
Patented Aug. 20, 1957

2,803,228

ECCENTRICALLY MOUNTED SPARK PLUG

Helge B. Sorensen, Ferndale, Mich., assignor to Studebaker-Packard Corporation, a corporation of Michigan Application May 10, 1954, Serial No. 428,668

17 Claims. (Cl. 123—32)

The present application relates to internal combustion engines, particularly to an adaptive fitting for internal combustion engine cylinder heads which eccentrically adjustably mounts a cyclically timed combustion controlling device thereto, for instance a spark plug device, in a manner whereby the device can be shifted in its geometrical relationship to the combustion chamber and other components thereof.

The effectiveness of propagation of a flame wave or a burning fuel mixture in the combustion chambers of gasoline and diesel engines, for example, depends on several critical factors such as the shape of the combustion chamber, the cyclical time of firing to initiate the combustion process, the physical location of the point or source at which the combustion process actually originates, and to a less recognized extent the important factor of the specific geometrical relationship between the point at which combustion actually initiates and those portions of the combustion chamber which characteristically are maintained at inherently differing temperatures from one another. Specifically, an exhaust valve in a combustion chamber runs considerably hotter than a companion intake valve and as such forms a comparatively hotter radiating body to which a flame front naturally proceeds with greater relative velocity and facility than to the cooler intake valve which during each engine cycle has the advantage of being bathed in known manner in a stream of cool induction air or fuel charged induction mixture. For a given engine, a mere variation in the quality or chemical proportions of the fuel employed can necessitate a change in timing for attaining optimum results with such fuel and in addition can cause a decided difference in the detailed pattern with which the flame front develops and propagates, and the valve and other local combustion chamber temperatures relative to one another depend in part on these particular characteristics of the individual fuel. It will be appreciated that a decided advantage is to be realized if for a given engine a compensating adjustment means were to be embodied therein to adjust the initiation point of flame wave propagation for optimum results for each fuel and for a varying set of operating conditions notwithstanding the fact that the design of existing engines has traditionally proceeded on the theory that spark plug and/or injector locations are fixed on the drawing board as to final location the same as are the valves and the general configuration of the combustion chamber.

An object of the invention herein disclosed is the provision of a simple but effective means of accomplishing the foregoing adjustment to suit the current needs of an engine for optimum performance under a specified set of anticipated operating and combustion conditions.

Aother object is to provide an adaptive fitting for adjustably mounting a spark plug device or other cyclically timed combustion controlling or initiating device in a valve controlled combustion engine for varying the physical position of such device through a range from which the optimum point or points of location can be broadly determined for a given valve location and combustion chamber shape.

Another object of the invention is the broad application in a combustion chamber, of an eccentrically mounted spark plug which when rotated about an axis from which the electrodes thereof are offset will shift to expose the electrodes to the fuel charge at different patch areas or localities of the combustion chamber.

Another object of the invention according to at least one embodiment is to provide for reception in a cavity of a cylinder head disposed at one end of a combustion chamber, a mounting fitting retainably slidably journaled in the cavity and having an angularly related spark plug therein which is readily shifted in its position in the chamber due to simple rotative movement of the mounting fitting.

Further features, objects, and advantages will either be specifically pointed out or become apparent when, for a better understanding of the invention, reference is made to the following written desception taken in conjunction with the accompanying drawings in which Figure 1 is an end view in elevation showing an engine embodying the spark plug adjustment feature of the present invention;

Figures 1, 2:
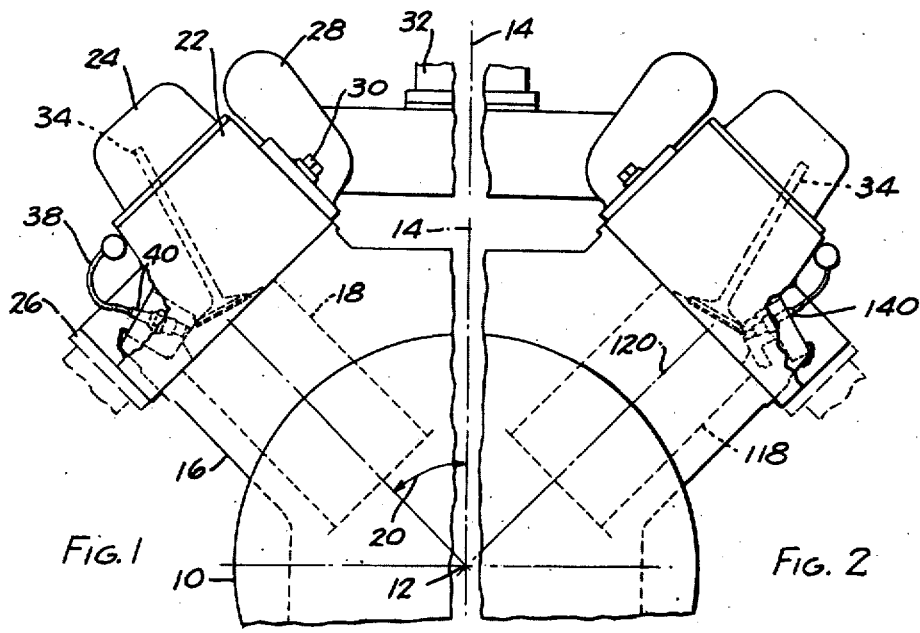
Figure 2 is an end view complementally illustrated with respect to Figure 1 but showing an engine embodying a modified form of the invention.
Figure 3:
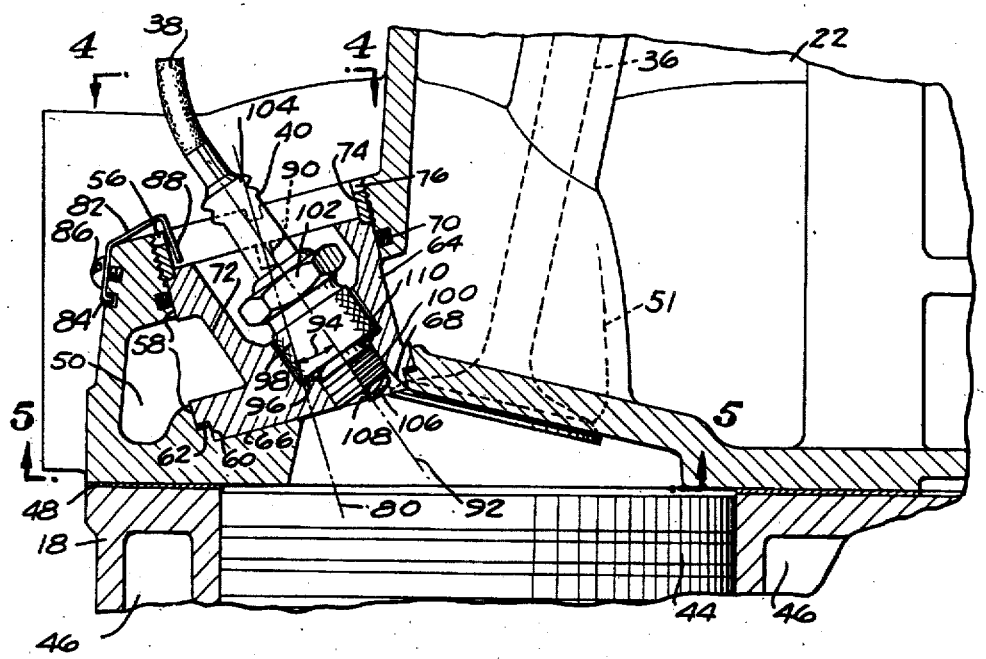
Figure 3 is an enlarged broken away transverse section of the engine of Figure 1.
Figure 4:
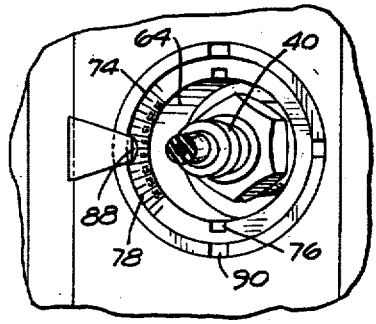
Figure 5:
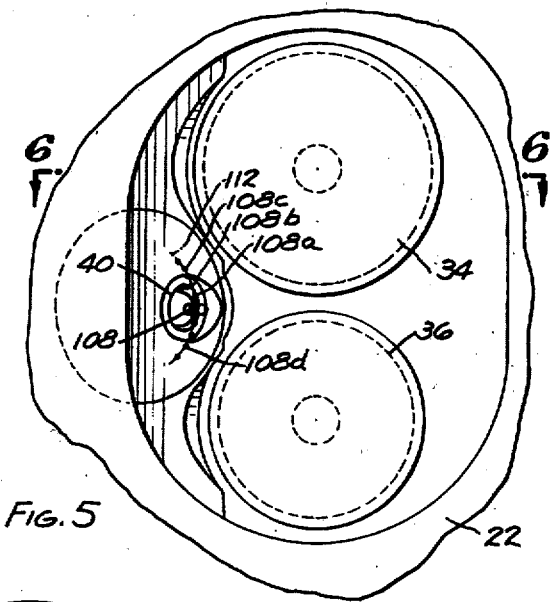
Figure 6:
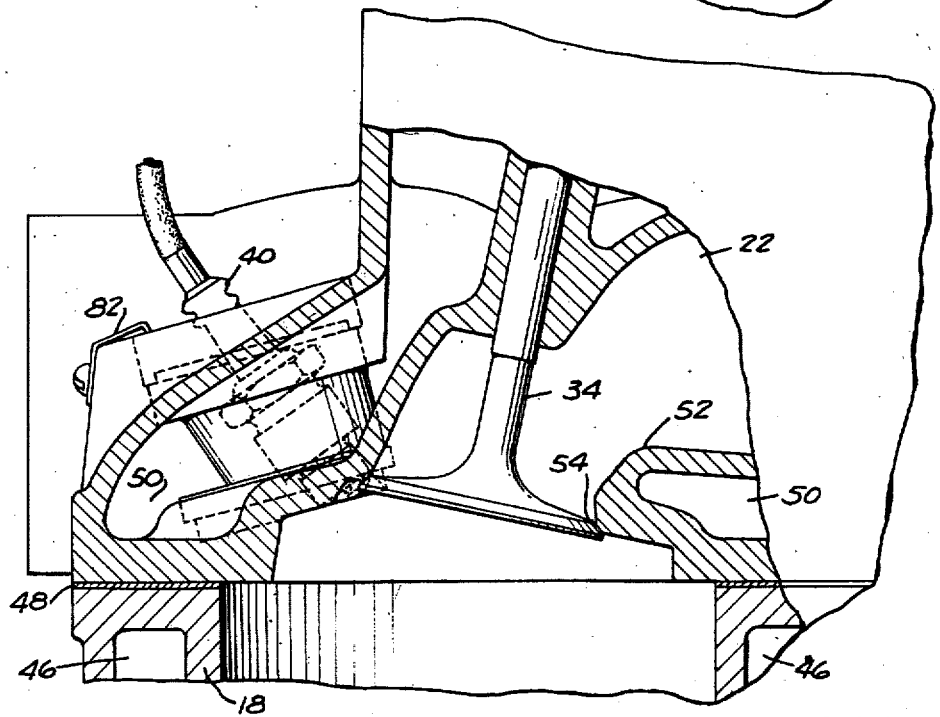

Figures 4 and 5 are respective top and bottom plan views taken along the respective lines 4—4 and 5—5 of Figure 3;

Figure 6 is a transverse sectional view similar to Figure 3 but taken along the lines 6—6 of Figure 5;

Figure 7 is a perspective view of the adaptive fitting for the adjustably positionable spark plug;

Figure 8 is an enlarged broken-away transverse section showing the modification according to and corresponding with Figure 2; and, Figure 9 is a transverse section showing a modification of Figure 3.

In Figures 1, 3, 4, 5, 6, and 7 of the drawings an eight-cylinder internal combustion V-type gasoline engine 10 is shown which is illustrative of one environment to which the present invention may be applied. The engine 10 has a principal longitudinal axis 12 defined by a crank shaft, not shown, and contained in the vertical central plane of the engine indicated at 14. The engine 10 has two banks, such as indicated at 16, of four longitudinally aligned cylinders each as at 18. The banks 16 are arranged at a 90° angularity to one another with the result that the plane of the cylinders 18 in each bank is disposed at a 45° angle indicated at 20 with respect to the vertical central plane 14 of the engine. Each bank 16 of cylinders 18 has a common longitudinally extending head at 22 for closing the latter which carries a valve chamber cover 24 at the upper outer end thereof. On the lower lateral side of each head 22 an exhaust manifold 26 is secured by suitable bolts, not shown, and on the opposite inward side of the head 22 an intake manifold 28 is secured as by a set of bolts 30. A carburetor supplied induction conduit 32 included in the angle between the two V-related banks 16 supplies the intake manifold 28 with a gasoline mixture which is separately distributed thereby to the individual cylinders 18. Each head 22 carries a reciprocally slidable pair of independently actuated intake and exhaust valves respectively indicated at 34 and 36.

An ignition harness 38 carries individual high-tension electrical leads to a set of spark plugs 40 provided one for each of the cylinders 18 in the two banks. The spark plugs 40 constitute cyclically timed combustion controlling devices in a broader sense but specifically they each function as a cyclically timed combustion initiating device for the individual ones of a set of combustion chambers 42 in association therewith. The bottom side of each combustion chamber 42 is closed off by a ringed and sealed piston 44 which is slidably mounted along an axis of reciprocation in the plane of the cylinders each associated with and disposed within one cylinder 18. Each of the cylinders 18 is provided with a cored annular cavity 46 surrounding the same and adapted to contain cooling water for keeping the cylinder walls cool. A gasket 48 is clamped between the outer mouth of each cylinder 18 and the common head 22 for the corresponding bank of cylinders. The head 22 is of an internally passaged construction which is formed with a set of cored spaces 50 adapted to contain cooling water for cooling the head. In addition the head 22 on each bank of the engine is provided with a set of exhaust and intake passages 51, 52 and providing a set of combustion chamber ports such as an intake port indicated at 54 controlled by an intake valve 34 or an exhaust valve 36 as appropriate. The valves 34, 36 are operated in timed relation to the reciprocating pistons 44 and crankshaft in well known manner such as by a cam shaft, push rods, and rocker arms of the traditional overhead valve type. Each of the ported intake passages 52 is supplied from an intake manifold 28 and each of the exhaust passages 51 in the head 22 discharges into the exhaust manifold 26.

In addition to the chambers and passages already noted in the head 22, a two-depth cavity having a threaded outer mouth 56 is also formed in the head 22 and has a peripheral zone of one depth indicated at 58. A central zone 60 of a greater depth is disposed adjacent to the peripheral zone 58 and due to the fact of the relatively greater inside diameter of the latter a seating shoulder 62 is included between and separates the zones. An adaptive fitting 64 for eccentrically mounting the spark plug 40 is received in the two-depth cavity in the head 22 so as to rest generally in the vicinity of a floor 66 defined by the bottom of the central zone 60 of the two-depth cavity. A sealing gasket 68 is clamped between the shoulder 62 in the two-depth cavity and a companion shoulder formed on the fitting 64 which has smooth outer surfaces slidably received within the two-depth cavity. A groove formed in the wall of the two-depth cavity receives an annular O ring 70 which may be of exactly circular cross section and which seals the companion smooth surfaces of the fitting 64 and the walls of the two-depth recess. The two-depth recess intersects the cooling chamber 50 in the cylinder head 20 such that the walls of the cavity are in effect relatively relieved adjacent a correspondingly relatively relieved portion 72 formed on the fitting 64 and together they define a common cooling passage for water or other coolant adapted to cool both the fitting 64 and the remaining structure of the cylinder head 22. The adaptive fitting 64 is of annular externally smooth surfaced construction and is retained in place by means of an open-centered annular screw or nut 74 which is threadably received in the threads 56 at the mouth of the two-depth cavity. The retaining nut 74 is transversely notched as at 76 around its outer end to receive a suitable spanner wrench or other tool for removing and for tightening the same and the fitting 64 in place. As best seen in Figure 4 the annular fitting 64 has formed in the upper outer peripheral surface thereof a set of indicia 78 marked off in angular degrees representative of the relative angle of rotation of the adaptive fitting 64 about its central axis of rotation indicated at 80 within the two-depth cavity of the cylinder head 22.

An indicator device 82 formed of a bent tab of sheet metal has a tang 84 at the base thereof received in a suitable pilot hole in the external surface of the head 22 and is secured in a nonshiftable position with respect to the latter as by a screw 86 associated in the vicinity of the tang 84. The overhanging end of the indicator 82 has an apex 88 forming a pointer by means of which the indicia 78 are readily read by mere inspection. The fitting 64 is formed with a set of transverse end slots 90 similar to the tool receiving slots 76 in the nut 74 and serving as a means of rotating the adaptive fitting 64 in the cavity resulting in a change of the angular reading on the indicia 78. The spark plug 40 and the fitting 64 are angularly related to one another by virtue of the fact that a two-depth plug receiving cavity in the fitting 64 is generated about a central axis 92 which defines an included angle indicated at 94 with respect to the central axis 80 of the fitting 64. The angle indicated at 94 may be of the order of 20° in the illustrated form shown in Figure 3.

A shoulder 96 formed within the two-depth cavity within the fitting 64 defines a line of demarcation between a peripheral zone 98 of one depth and a threaded central zone 100 of a greater depth within the cavity, the latter of which threadably receives the threaded end of the spark plug 40 which may be of conventional construction. The spark plug 40 has a hexagonally shaped tool receiving section 102 adjacent the bottom of a ceramic covering 104 thereabout and at its lower depending end is provided with a pair of center and ground electrodes 106 which define an included spark gap 108. A compressible copper gasket at 110 serves to seal the spark plug adjacent its threaded portion to the shoulder 96 in the two-depth gasket within the adaptive fitting 64. The floor 66 of the central zone 60 in the two-depth cavity in the head 22 is formed with an opening therein which directly communicates with the combustion chamber 42 and the spark plug gap 108 is continually located substantially in the plane of such combustion chamber opening.

With reference particularly to Figures 3 and 5, it will be noted that when the screw threaded plug retaining nut 74 is backed off slightly from the clamping engagement it normally makes with the fitting 64, the fitting 64 may be relatively rotated by means of the tool notches 90 such that the spark plug electrode gap 108 will travel along a rotatable path of movement substantially in the plane of the adjacent combustion chamber opening and about the central axis 80 of the adaptive fitting 64 as a center. Accordingly the spark plug gap 108 may be shifted into a variety of positions such as at 108a, 108b, and 108c in a direction toward the intake valve 34 adjacent thereto and in the opposite direction the gap 108 may be shifted into a corresponding number of positions broadly indicated at 108d in the vicinity of the exhaust valve 36. The specific arc of travel is indicated at 112. It is the usual practice in the design of certain engines to locate the spark plug gap 108 at a point relatively closer to the intake valve than to the relatively hotter exhaust valve by reason of the fact that a combustion flame wave tends to move faster in the direction of a hot radiating body than in the direction of a relatively cooler body such as exemplified by an intake valve 34. The theory behind such location at dissimilar distances from the valves is that a recognized advantage in combustion and engine smoothness will be realized whenever the flame wave propagates uniformly across a combustion chamber area such that the individual portions of the front arrive at the most remote region in the chamber at approximately coinciding times. Under differing fuel conditions and operating characteristics of the engine, however, the flame wave may not follow a characteristic pattern consistently and in such circumstances it will be desirable to uniformly adjust the spark plug gaps 108 in the cylinders as in Figure 5 to an optimum intermediate position such as 108a, 108b, or 108c to fit the particular circumstances. Thus the spark gap of each of the plugs 40 in the engine can be uniformly shifted to the same relative position between their associated intake and exhaust valves 34, 36 merely by bringing the readings of their indicia 78 to a common value by the adjustment just noted.

Under certain circumstances it may be found advantageous to have the cyclically timed combustion controlling device disposed with its axis parallel to the axis of the adaptive fitting, particularly for instance in the case of an injector nozzle.

Illustrative of an arrangement whereby such parallel relationship is maintained in the analogous example of a cyclically timed spark plug 140 according to the modification of Figures 2 and 8. The same type 90° V-8 gasoline engine is illustrated in connection with the embodiment of Figures 2 and 8 as with the preceding embodiment and in such instance includes two banks of four cylinders each indicated at 118 of which the plane of the cylinders indicated at 120 forms an included 45° angle with respect to the vertical central plane 14 of the engine. An overhead valve type cylinder head 122 forms one end of a combustion chamber 142 and is internally passaged so as to define an exhaust valve passage 152 and a set of cooling water chambers 150. An approximately two-depth cavity is formed in the head 122 and has a set of threads 156 at the outer mouth thereof. The two-depth cavity includes an outer peripheral zone 158 and a central zone of a greater depth 160 having a floor 166 at the bottom thereof. Adjacent an included shoulder between the two zones the outer peripheral zone 158 intersects the cooling chambers 150 so as to be relatively relieved in adjacency thereto and together they define a common cooling water passage for water to cool an adaptive fitting 164 received in the two-depth cavity. The adaptive fitting 164 is suitably sealed and retained in place as by a threaded open-centered nut 174 in a similar manner to the preceding embodiment. The outer peripheries of the adaptive fitting 164 are smooth and are slidably received in the two-depth cavity for rotation therein facilitated as by a plurality of tool receiving ribs 190 about a central axis of rotation 180 which coincides with the central axis of the fitting 164. A two-depth cavity is formed about an axis 192 within the fitting 164 which is parallel to but spaced apart from the central axis 180 in laterally offset or eccentric relationship. The floor 166 of the central zone 160 in the cavity has an opening therein adjacent to which the spark plug 140 presents a pair of center and ground electrodes 107. The electrodes 107 define an included spark gap 109 which due to their eccentric relationship with respect to the central axis 180 rotate in an annular arc or path of travel substantially in the plane of the opening in the floor 166 of the central zone 160. In a similar manner the spark plug 140 of Figures 2 and 8 can be shifted in its relative position with rspect to a set of intake and exhaust valves respectively indicated at 34 and 36, and a set of similar indicia 178 marked off in degrees and an indicating pointer 182 are likewise provided to give predetermined calibrated readings by mere inspection.

As herein disclosed the invention is shown embodied in a spark ignition internal combustion engine in a fashion whereby the present rotatably adjustable fitting mounts the spark device therein in eccentric relationship for bodily shifting the position of the electrode spark gap in the engine combustion chamber. It is evident that the fitting may be used to advantage to mount other combustion controlling discharge devices as for example the rotatably adjustable mounting fitting may be realized in diesel injection type engines for similarly mounting the diesel fuel injector nozzle in eccentric relationship for bodily shifting the spray tip thereof in the engine combustion chamber or precombustion chamber to determine the optimum position for combustion and accommodating the individual qualities of different character fuels which might be best introduced from differing positions to utilize each fuel for maximum performance. Such an arrangement is shown in Figure 9 where an adaptive fitting 264 has a fuel injector nozzle 265 threadably received therein. The nozzle 265 is fed by a fuel line 267 and has an outlet 269 for the discharge of atomized fuel 271 into the combustion chamber 242. In a manner similar to the arrangement of Figure 3, nozzle 265 may be shifted to its most advantageous position. Other elements of the structure shown in Figure 9 are identical to those of Figure 3.

So also the drawing shows the indicia means arranged to be carried by the fitting for comparative angular reading on basis of their relative position to a stationary pointer serving as a bench mark, but self-evidently the end of the pointer may be modified to carry indicia stationarily in adjacency to which a moving pointed boss or other indicator formed on the fitting such as the rib 190 may be used as a basis for comparative readings. The spark gap of the spark plugs 140 and 40 appears to be approximately transversely aligned with respect to the bottom of the fitting adjacent the associated combustion chamber opening such that the plane of travel of the gap during rotation of the fitting substantially coincides with the plane of the opening but indeed the coincidence between these latter planes is not essential and the spark plug electrodes may in some instances be upwardly offset somewhat from the plane of the opening or conceivably it may protrude in the opposite direction so as to pass downwardly through the opening and extend to a point well inside the combustion chamber.

Variations within the spirit and scope of the invention described are equally comprehended by the foregoing description.

What is claimed is:

1. In a valve controlled combustion chamber structure in an internal combustion engine having cylinder head means forming an upper domed side of the combustion chamber and provided with a cavity in the dome communicatively connected to the combustion chamber at a point spaced apart from the valves, a spark plug receiving fitting mounted in the cavity in the head means to assume rotatably adjustable positions about its own axis, and a spark plug rotatively fast to and received in the fitting with the electrodes thereof mounted eccentrically to the axis of the fitting within the combustion chamber and shiftable with respect to said point into predetermined spaced apart relationships to the valves incident to a change in the position assumed by the fitting in the above described manner of rotatable adjustment.

2. In a valve controlled combustion chamber structure in an internal combustion engine having a cylinder head forming one end of the combustion chamber and formed with a cavity communicatively connected to an opening in the combustion chamber spaced apart from the valves, a fitting mounted within the cavity in the head to assume rotatably adjustable positions over the opening about a reference axis passing through the opening, and a combustion controlling discharge device rotatively fast to and received in the fitting with a protruding depending portion of the former disposed eccentrically to the reference axis substantially in the plane of the opening and shiftable with respect to the latter into predetermined spaced apart relationships to the different valves incident to a change in the position assumed by the fitting in the above described manner of rotatable adjustment, said device being constructed and arranged to affect a variation of the combustion within said chamber dependent upon its position.

3. In a valve controlled combustion chamber structure in an internal combustion engine having a head forming an upper domed side of the combustion chamber and provided with an opening in the dome spaced apart from the valves, an internally threaded annular receiving fitting having a substantially longitudinally extending hollow interior and being mounted to the head to assume rotatably adjustable positions about a reference axis passing through the opening, and a combustion controlling discharge device angularly related to and securely threaded within the hollow interior of the fitting such that a depending portion thereof is off center to the axis of the fitting within the opening and shiftable with respect to the opening into predetermined spaced apart relationships to the valves incident to a change in the position assumed by the fitting in the above described manner of rotatable adjustment, said device being constructed and arranged to affect a variation of the combustion within said chamber dependent upon its position.

4. In an engine having a combustion chamber, a cylinder head forming a domed end for the combustion chamber and having a cavity which communicatively registers with an opening in the combustion chamber dome, an electrode-carrying plug passing through the cavity such that the electrodes protrude eccentrically from the cavity and into the opening in the combustion chamber dome, means in the cavity within which the plug fits for attachment to head, said means having smooth surfaced interfaces of contact complementary with respect to companion surfaces formed in the cavity in the head and being adapted to be sealed in fluid tight relationship to the latter, and retainer means for securing the last named means into predeterminedly adjustable rotative positions relative to the head within the cavity therein.

5. In an engine having an apertured combustion chamber, a cylinder head forming a domed end for the combustion chamber and having a cavity which communicatively registers with an aperture in the combustion chamber dome, an electrode-carrying plug passing through the cavity such that the electrodes protrude eccentrically from the cavity and into the aperture in the combustion chamber dome, means in the cavity within which the plug fits for attachment to head, said means having smooth surfaced journal faces of contact complementary with respect to companion bearing surfaces formed in the cavity in the head, and retainer means for securing the last named means into predeterminedly adjustable rotative positions relative to the head within the cavity therein.

6. In an engine having a combustion chamber, a cylinder head forming a domed end for the combustion chamber and having a cavity which communicatively registers with an opening in the combustion chamber dome, an elongated combustion controlling discharge device passing through the cavity such that a depending extremity thereof protrudes eccentrically from the cavity and into the opening the combustion chamber dome, and annular means within which the device rigidly fits for attachment to head and having a longitudinal axis passing through said opening, said means having smooth surfaced interfaces of contact complementary with respect to companion surfaces formed in the cavity in the head for journaled movement about its longitudinal axis and being adapted to be sealed in fluid tight adjustably journalled relationship to the latter, said device being constructed and arranged to affect a variation of the combustion within said chamber dependent upon its position.

7. In a fuel burning engine having a spark plug for igniting the fuel therein, an internally passaged cylinder head forming one side of a domed combustion chamber, said cylinder head having an inwardly directed cavity terminating in an opening in the combustion chamber, and a fitting rotatably received in the cavity for mounting the spark plug in the head in registry with said combustion chamber opening, the walls of said fitting and said cavity being mutually relatively relieved to define portions of a common chamber for the passage of a stream of coolant.

8. In a fuel burning engine having a spark plug for igniting fuel therein, an internally passaged overhead valve cylinder head forming one end of a domed combustion chamber, said cylinder head having an inwardly directed cavity terminating in an opening in the combustion chamber spaced apart from the overhead valves, and a fitting rotatably received in the cavity for mounting the spark plug in the head in registry with said combustion chamber opening, the walls of said fitting and said cavity being mutually relatively relieved in at least one area to define portions of a common chamber for the passage of a flow of cooling liquid.

9. Calibrated means for so mounting a spark plug in the head of an overhead valve type engine that the plug electrodes can be predeterminedly laterally shifted in their spaced relationship to the different valves, said means including an annularly formed plug mounting fitting having a threaded spark plug socket therein, and presenting a transverse bearing surface having engagement with means in the head and twisting thereupon during rotative movement of the fitting about its axis, said threaded socket being laterally offset from the axis of the fixing to effect an eccentric relationship between the plug electrodes and the latter axis, threaded retainer means for holding the fitting in prestressed thrust engagement bearing against the head, indicator means having a base portion for fixed attachment to the head adjacent the retainer and the fitting, and a set of indicia calibrations carried by the mounting means for indicating the position of relative rotation existing between the indicator means and the spark plug mounting fitting.

10. Calibrated means for so mounting a spark plug in the head of an overhead valve type engine that the plug electrodes can be predeterminedly laterally shifted in their spaced relationship to the fixed location of the different overhead valves, said means including an annularly formed fitting having a spark plug socket therein, and presenting a transverse bearing surface for slidable engagement with means in the head during rotative movement of the fitting about its axis, said socket being laterally offset from a reference axis to effect an eccentric relationship between the plug electrodes and the latter axis, threaded retainer means for holding the fitting in prestressed engagement bearing against the head, an indicator pointer having a base portion for fixed attachment to the head adjacent the retainer and the fitting, and a set of indicia calibrations carried by the fitting in a path of movement adjacent the pointer for visibly indicating the position of relative rotation existing between said head and said spark plug mounting fitting and spark plug.

11. Calibrated means for so mounting a spark plug in the head of an overhead valve type engine that the plug electrodes can be predeterminedly laterally shifted in their spaced relationship to the different valves, said means including an annularly formed fitting having a threaded spark plug socket therein, and presenting a transverse bearing surface for slidable engagement with means in the head during rotative movement of the fitting about its axis, said threaded socket being disposed in spaced apart parallelism to the axis of the fitting to effect an eccentric relationship between the plug electrodes and the latter axis, indicator means having a base portion for fixed attachment to the head adjacent the retainer and the fitting, and a set of indicia calibrations carried by the mounting means for visibly indicating the position of relative rotation existing between the indicator means and the spark plug mounting fitting.

12. In an internal combustion engine having a working cylinder, a head for structurally closing off one end of the working cylinder to form an apertured combustion chamber, said head having a cavity therein providing a peripheral zone of a given dimension and one depth and a central zone of a smaller and greater depth communicating with the aperture in the combustion chamber, a spark plug presenting a spark gap operatively located in proximity to said aperture for communicating with said combustion chamber, and a fitting for the spark plug received in said cavity above said aperture, said fitting having a relieved portion along its length, and the walls of said cavity being likewise relieved in one of the two said zones thereof at a depth aligned with the relieved portion of the fitting to define companion portions of a common internal cooling chamber.

13. In an internal combustion engine having a working cylinder, a head for structurally closing off one end of the working cylinder to form a combustion chamber, said head having a cavity therein providing at least a peripheral zone of a given dimension and one depth and a central zone of a smaller and greater depth communicating with an opening in the head communicating with the combustion chamber, a spark plug presenting a spark gap operatively located adjacent said opening to communicate with said combustion chamber, and a spark plug fitting rotatably received in said cavity over the opening in the combustion chamber, said fitting having a relatively relieved outer portion along its length, and the walls of said cavity being relatively relieved at a depth aligned with the relieved portion of the fitting to define companion portions of a common internal cooling chamber.

14. In combination with an internal combustion engine having a combustion chamber of a rotatably disposed generally annular mounting fitting for a spark discharge device, and having a longitudinal central axis about which the fitting is adapted to rotate with one end thereof exposed in said chamber and a generally elongated spark discharge device substantially longitudinally arranged within the fitting and threadably engaged with the interior thereof in a fixed position so as to have its spark gap exposed at said one end of the latter with the corresponding spark gap end portion of the device offset with respect to the longitudinal central axis of rotation of the fitting, said device being constructed and arranged to affect a variation of the combustion within said chamber dependent upon its position.

15. In combustion chamber structure having a combustion chamber opening therein, a mounting fitting having means for rotatably attaching the same to the structure in a position covering the opening, and having a longitudinal central axis which passes through the opening and about which the fitting is adapted to rotate, and a generally elongated combustion controlling discharge device substantially longitudinally arranged within the fitting, and threadably engaged with the interior thereof, and exposed at one end of the latter with the corresponding end portion of the device offset from the longitudinal central axis of the fitting in a location substantially within the opening, said device being constructed and arranged to affect a variation of the combustion within said chamber dependent upon its position.

16. In a valve controlled combustion chamber structure in an internal combustion engine having cylinder head means forming an upper domed side of the combustion chamber and provided with a cavity communicatively connected to the combustion chamber at a point spaced apart from the valves, an annular fitting having a substantially longitudinally extending hollow interior portion and having a longitudinal axis, said fitting being received in said cavity in releasably journalled relationship with respect to the head means to assume rotatably adjustable positions about its longitudinal axis in general adjacency to said point and a combustion controlling discharge device rotatively fast to and received within the hollow interior of the fitting and having a depending portion disposed eccentrically to the longitudinal axis of the fitting within the combustion chamber and shiftable with respect to the combustion chamber into predetermined spaced apart relationships to the valves incident to a change in the position assumed by the fitting in the above described manner of rotatable adjustment, said device being constructed and arranged to affect a variation of the combustion within said chamber dependent upon its position.

17. In combination with an internal combustion engine having a combustion chamber, a rotatably disposed mounting fitting for a combustion controlling discharge device having a longitudinal central axis which is exposed at one end in said chamber, and a generally elongated combustion controlling discharge device substantially longitudinally arranged within the fitting and exposed at said one end of the latter with the corresponding end portion of the device offset from a longitudinal central axis of the fitting, said device being constructed and arranged to affect a variation of the combustion within said chamber dependent upon its position.

References Cited in the file of this patent

UNITED STATES PATENTS

| 2,148,702 | MacClatchie | Feb. 28, 1939 |

FOREIGN PATENTS

| 146,077 | Great Britain | Nov. 11, 1920 |
| 214,245 | Switzerland | July 1, 1941 |

UNITED STATES PATENT OFFICE
CERTIFICATE OF CORRECTION

Patent No. 2,803,228 August 20, 1957

Helge B. Sorensen

It is hereby certified that error appears in the printed specification of the above numbered patent requiring correction and that the said Letters Patent should read as corrected below.

Column 5, line 4, for "in the" read --is the--; column 7, line 44, before "the combustion" insert --in--; column 8, line 12, for "fixing" read --fitting--

Signed and sealed this 4th day of February 1958.

(SEAL)
Attest:

KARL H. AXLINE

Attesting Officer

ROBERT C. WATSON
Commissioner of Patents